United States Patent [19]
Kawakami et al.

[11] Patent Number: 5,658,689
[45] Date of Patent: Aug. 19, 1997

[54] RECHARGEABLE LITHIUM BATTERY HAVING A SPECIFIC ELECTROLYTE

[75] Inventors: Soichiro Kawakami; Naoya Kobayashi, both of Nara; Masaya Asao, Kyoto-fu, all of Japan

[73] Assignee: Canon Kabushiki Kaisha, Tokyo, Japan

[21] Appl. No.: 708,653

[22] Filed: Sep. 5, 1996

[30] Foreign Application Priority Data

Sep. 6, 1995 [JP] Japan .................................. 7-252070

[51] Int. Cl.$^6$ .................................................. H01M 10/40
[52] U.S. Cl. ............................ 429/194; 429/198; 429/190
[58] Field of Search ................................ 429/198, 194, 429/197, 196, 188, 190

[56] References Cited

U.S. PATENT DOCUMENTS 4,400,449  8/1983  Henk ................................. 429/198 X
5,437,944  8/1995  Kita et al. ........................... 429/195

FOREIGN PATENT DOCUMENTS 63-013264  1/1988  Japan .
63-114057  5/1988  Japan .
05047381   2/1993  Japan .
5-190171   7/1993  Japan .
5-234585   9/1993  Japan .

*Primary Examiner*—Anthony Skapars
*Attorney, Agent, or Firm*—Fitzpatrick, Cella, Harper & Scinto

[57] ABSTRACT

A rechargeable lithium battery comprising at least an anode, a separator, a cathode, and an electrolyte integrated in a battery housing, characterized in that said electrolyte comprises a salt of an organic fluorine-silicon compound containing at least fluorine, silicon and carbon elements as the constituents.

13 Claims, 3 Drawing Sheets

RECHARGEABLE LITHIUM BATTERY HAVING A SPECIFIC ELECTROLYTE

BACKGROUND OF THE INVENTION

1. Field of the Invention

The present invention relates to a highly reliable rechargeable lithium battery using intercalation and deintercalation reactions of lithium ion in charging and discharging.

The rechargeable lithium battery using intercalation and deintercalation reactions of lithium ion in charging and discharging will be hereinafter simply referred to as rechargeable lithium battery. And the rechargeable lithium battery in the present invention is meant to include a lithium ion battery.

More particularly, the present invention relates to an improved, highly reliable rechargeable lithium battery provided with a specific electrolyte, which stably and continuously exhibits desirable battery performance without being deteriorated even upon the repetition of the charging and discharging cycle over a long period of time and has a prolonged charging and discharging cycle life.

2. Related Background Art

In recent years, global warming from the so-called greenhouse effect has been predicted due to increased level of atmospheric $CO_2$. To prevent this warming phenomenon from further developing, there is a tendency to restrict the construction of new steam-power generation plants which exhaust a large quantity of $CO_2$.

Under these circumstances, proposals have been made to institute load leveling in order to effectively utilize power. Load leveling involves the installation of rechargeable batteries at general locations to serve a storage for surplus power unused in the night, known as dump power. The power thus stored is available in the day time when the power demand is increased, leveling the load requirements in terms of power generation.

Separately, there is an increased societal demand for developing a high performance rechargeable battery with a high energy density for an electric vehicle which would not exhaust air polluting substances. There is further increased societal demand for developing a miniature, lightweight, high performance rechargeable battery usable as a power source for portable instruments such as small personal computers, word processors, video cameras, and pocket telephones.

In order to attain such a miniature and light weight rechargeable battery, various studies have been made of a rechargeable lithium battery which would allow the application of a high voltage and which would excel in energy density. For instance, use of a lithium-graphite intercalation compound as an anode active material in a rechargeable battery has been proposed (see, *Journal of the Electrochemical Society*, 117, 222, (1970)).

Since then, public attention has focused on a rocking chair type lithium ion battery. And various studies have been made in order to develop such a rocking chair type lithium ion battery. The rocking chair type lithium ion battery is typically configured such that a carbonous material is used as an anode active material and an intercalation compound intercalated with lithium ion is used as a cathode active material. The and lithium ion is intercalated into the six-membered network layer planes provided by carbon atoms to store in the battery reaction upon charging. Presently, several rocking chair type lithium ion batteries are known having such a configuration, which are practically usable. In these lithium ion rechargeable batteries, the carbonous material serving as a host for allowing lithium ion as a guest to insert or release is used as the anode active material to prevent the growth of a lithium dendrite so that the charging and discharging cycle life is prolonged.

However, in any of these lithium ion batteries in which a carbonous material is used as the anode active material to store lithium atom therein, the discharge capacity capable of being stably provided upon the repetition of the charging and discharging cycle is not beyond the theoretical electric capacity of the graphite intercalation compound to store one lithium atom in six carbon atoms, and therefore, there can be attained a mere electric capacity capable of storing one lithium atom in 10 carbon atoms in a practical range in terms of the repetition number of the charging and discharging cycle.

In this respect, based on the constitution of the foregoing lithium ion battery in which a carbonous material is used as the anode active material, although it is satisfactory in terms of the charging and discharging cycle life, there cannot be attained a desirable energy density similar to that in a primary lithium battery in which a lithium metal itself is used as the anode active material.

As for anode with an anode active material comprising a carbonous material capable of storing lithium atom therein, an attempt has been made to make it such that it can store a large amount of lithium atom so as to attain an increased battery capacity. However, this is not realistic because problems result, wherein as the charging and discharging cycle proceeds, an insulating film is formed on the surface of the anode due to chemical reaction with an electrolyte solution to raise the impedance of the anode. In addition, the electrolytic solution is gradually decomposed as the Charging operation is repeated, resulting in shortening the charging and discharging cycle life.

Separately, various studies have been made of a rechargeable lithium battery having a high electric capacity in which a metallic lithium is used as the anode. However, such a rechargeable lithium battery is problematic in that lithium is often deposited in a dendritic state (that is, in the form of a dendrite) on the anode during the charging operation, resulting in causing internal-shorts between the anode and the cathode upon repeating the charging and discharging cycle, wherein there cannot be attained a sufficient charging and discharging cycle life.

Particularly, once a lithium dendrite forms on the anode, the lithium dendrite is liable to gradually grow when the charging operation is repeated, resulting in causing internal-shorts between the anode and the cathode. When the anode is internally shorted with the cathode, the energy possessed by the battery is rapidly consumed at the internally shorted portion resulting in problems such that the battery is heated or the solvent of the electrolyte solution is decomposed by virtue of heat to generate gas, thereby raising the inner pressure of the battery. These problems result in damaging the rechargeable lithium battery or/and shortening the lifetime of the battery.

The experimental studies by the present inventors of the occurrence of such problems as above described provided findings as will be described in the following. That is, lithium deposited upon the charging operation is very active, and because of this, the deposited lithium readily reacts with an electrolyte solution or impurities such as water or an organic solvent contained in the electrolyte solution to form an insulating film on the surface of the anode. The insulating film thus formed on the surface of the anode is not uniform.

Because of this, upon charging, the electric field converges at portions on the surface of the anode where lithium is locally deposited in a dendritic state and the lithium dendrite deposit often reaches the cathode to result in causing the internal-shorts between the anode and the cathode. In addition, the electrolyte of the electrolyte solution is often dissociated to produce a dissociated electrolyte serving as a polymerization initiator. This dissociated electrolyte polymerizes the organic solvent contained in the electrolyte solution to cause the formation of a polymerized product, which sometimes results in not only raising the internal impedance of the battery but also decomposing the electrolyte solution. As a result, the charging and discharging cycle life of the rechargeable lithium battery is often shortened.

Hence, based on the constitution of the foregoing rechargeable lithium battery, it is difficult to effectively prevent the generation of a dendrite and it is also difficult to realize a practically usable rechargeable lithium battery which stably and continuously exhibits a high battery performance.

In order to attain a high performance rechargeable lithium battery while having a due care about the foregoing situation, there has been proposed a manner of using a lithium alloy such as lithium-aluminum alloy as the anode for a rechargeable lithium battery. However, this manner is not effective in attaining a high performance rechargeable lithium battery having a long charging and discharging cycle life.

Japanese Unexamined Patent Publications Nos. 13264/1988, 114057/1988, 47381/1993, and 190171/1993 disclose various lithium alloys to be used as the anode for a rechargeable lithium battery. In addition, Japanese Unexamined Patent Publication No. 234585/1993 discloses that the anode for a rechargeable lithium battery is constituted by a lithium metal having a powdery metal, which poorly forms an intermetallic compound with said lithium metal, uniformly deposited on the surface thereof. However, the use of any of the materials as the anode constituent disclosed in these documents is not decisively ensured to attain a desirable anode for a rechargeable lithium battery, having a markedly prolonged lifetime.

The *Journal of Applied Electrochemistry*, 22, 620–627 (1992) discloses a rechargeable lithium battery in which the anode is constituted by an aluminum foil having a surface applied with etching treatment. However, the rechargeable lithium battery disclosed in this document is problematic in that when the charging and discharging cycle is repeated as many as that practically conducted for the ordinary rechargeable battery, problems are liable to result in that as the charging and discharging cycle is repeated, the aluminum foil is repeatedly expanded and shrunk and cracks, resulting in causing a reduction in the current collecting performance, wherein the growth of a dendrite is liable to occur. Hence, in accordance with the manner disclosed in this document, there cannot be attained a rechargeable lithium battery having a sufficient charging and discharging cycle life which can be accepted at a practical use level.

Accordingly, there is an increased demand for an improved, highly reliable rechargeable lithium battery which has a long charging and discharging cycle life in the practical use range and has a high battery capacity.

SUMMARY OF THE INVENTION

A principal object of the present invention is to eliminate the foregoing problems found in the known rechargeable lithium batteries and to provide a highly reliable rechargeable lithium battery which is free of said problems.

A further object of the present invention is to provide an improved, highly reliable rechargeable lithium battery provided with a specific electrolyte, which has a high energy density and a prolonged charging and discharging cycle life.

A typical embodiment of a rechargeable lithium battery which attains the above objects of the present invention comprises at least an anode, a separator, a cathode, and an electrolyte (or an electrolyte solution) integrated in a battery housing, characterized in that said electrolyte comprises a salt of an organic fluorine-silicon compound containing at least silicon, fluorine, and carbon elements.

DESCRIPTION OF THE INVENTION AND PREFERRED EMBODIMENTS

Figure 1:
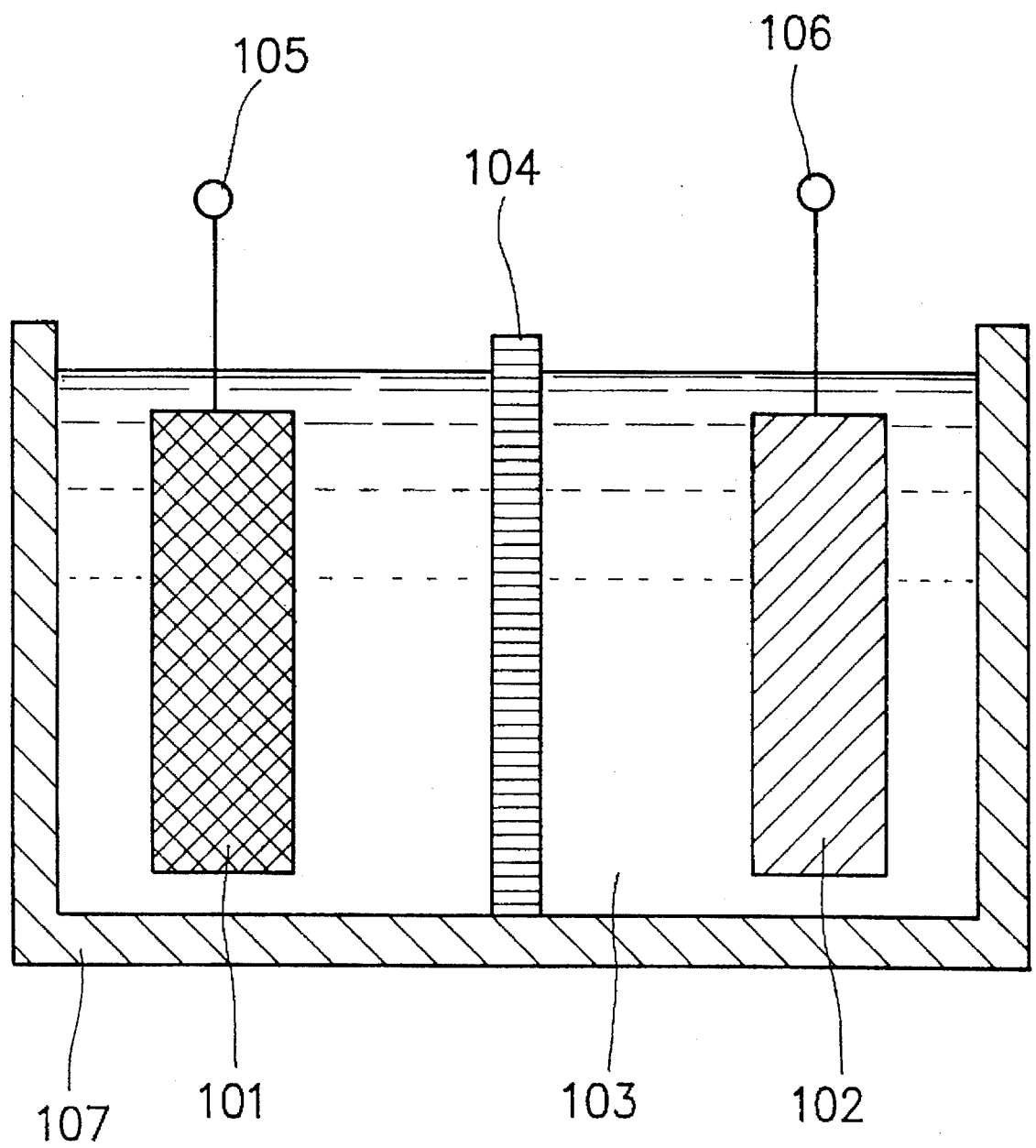
FIG. 1 is a schematic diagram illustrating the constitution of an example of a rechargeable battery according to the present invention.

A principal feature of the present invention lies in a specific electrolyte which provides a highly reliable rechargeable lithium battery having an improved energy density and a prolonged charging and discharging cycle life.

A typical embodiment of the electrolyte according to the present invention comprises an electrolyte material comprising a salt of an organic fluorine-silicon compound containing at least silicon, fluorine, and carbon elements (this salt will be hereinafter referred to as organic fluorine-silicon compound salt).

The use of the specific electrolyte (which comprises the above organic fluorine-silicon compound salt) in a rechargeable lithium battery provides those pronounced advantages which will be described in the following.

That is, the electrolyte itself poorly adsorbs moisture, and because of this, the moisture contained in an electrolyte solution comprising the electrolyte can be readily maintained at a low concentration. This prevents the occurrence of chemical reaction of lithium deposited upon the charge charging of the rechargeable lithium battery, with the moisture of the electrolyte solution, resulting in prolonging the charging and discharging cycle life of the rechargeable lithium battery.

Further, the electrolyte has a low catalytic activity as an initiator in polymerization reactions and because of this, the solvent contained in the electrolyte solution is prevented from being polymerized. Hence, a rechargeable lithium battery in which the electrolyte according to the present invention is used, has a prolonged charging and discharging cycle life.

The above properties of the electrolyte according to the present invention provides prolonged lifetime of the anode, which is relatively short in the conventional rechargeable lithium battery and high in energy density, so that the rechargeable lithium battery has not only a high energy density but also a prolonged charging and discharging cycle life.

In a preferred embodiment, the the foregoing organic fluorine-silicon compound salt as the electrolyte is made to have a phenyl group. In this case, the electrolyte is further improved such that it is extremely difficult to adsorb moisture and in addition, it is readily dissolved in an organic solvent, such as a nonaqueous solvent, to provide an increased ion electric conductivity in the electrolyte. This results in reducing the internal impedance in the rechargeable lithium battery. This situation provides a high electric current in the rechargeable lithium battery and to further prolong the charging and discharging cycle life of the rechargeable lithium battery.

In the following, description will be made of a rechargeable lithium battery according to the present invention while referring to the drawings.

FIG. 1 is a schematic diagram illustrating the constitution of an example of a rechargeable battery according to the present invention, which comprises at least an anode, a separator, a cathode, and an electrolyte, or an electrolyte solution, comprising the foregoing specific electrolyte according to the present invention, integrated in a battery housing.

In FIG. 1, reference numeral 101 indicates an anode, reference numeral 102 a cathode, reference numeral 103 an electrolyte, or an electrolyte solution, comprising the foregoing specific electrolyte according to the present invention, reference numeral 104 a separator, reference numeral 105 an anode terminal which is extending from the anode 101, reference numeral 106 a cathode terminal which is extending from the cathode 102, and reference numeral 107 a battery housing. As apparent from FIG. 1, the anode 101 and the cathode 102 are arranged so as to contact with the electrolyte 103 and oppose to each other. And the separator 104 is disposed between the anode 101 and the cathode 102 in order to prevent the occurrence of internal-shorts between the two electrodes.

In the following, description will be made of each of the constituents of the rechargeable lithium battery according to the present invention.

ELECTROLYTE

The electrolyte 103 comprises a salt of an organic fluorine-silicon compound (hereinafter referred to as organic fluorine-silicon compound salt).

The organic fluorine-silicon compound salt can include a lithium salt, sodium salt, potassium salt and ammonium salt represented by the General formula $M_m(R_nSiF_{4-n+m})$ with R being an alkyl group such as methyl group ($CH_3$—), ethyl group ($C_2H_5$—), butyl group ($C_3H_7$—), or the like, or an aromatic group such as phenyl (Ph) group ($C_6H_5$—), or the like, M being Li, Na, K, $R_4N$, or the like, m being a positive integer, n being a positive integer; and mixtures of two or more of these salts.

Any of these organic fluorine-silicon compound salts used in the present invention has a hygroscopic property which is lower than those of the salts of a cation (sodium ion, potassium ion, or tetraalkylammonium ion) with a Lewis acid ion ($BF_4^-$, $PF_6^-$, $AsF_6^-$, $ClO_4^-$, $CF_3SO_3^-$, or $BPh_4^-$ (with Ph being a phenyl group)) used as the electrolyte in the conventional rechargeable lithium battery.

Hence, the use of the organic fluorine-silicon compound salt as the electrolyte provides pronounced advantages as will be described in the following.

That is, the organic fluorine-silicon compound salt enables the preparation at a high quality electrolyte solution for use in a rechargeable lithium battery with very low moisture contamination thereinto. The use of this electrolyte solution as the electrolyte solution in a rechargeable lithium battery effectively prevents the occurrence of the foregoing problem found in the prior art in that a lithium deposited upon the charging operation reacts with moisture to form an insulating film of lithium hydroxide or the like on the surface of the anode.

In the case where the organic fluorine-silicon compound salt is one having an aromatic group such as phenyl group, the aromatic group-bearing organic fluorine-silicon compound salt is readily dissolved in an organic solvent. The use of the aromatic group-bearing organic fluorine-silicon compound salt as the electrolyte provides a high quality electrolyte solution having an increased ion electric conductivity and which is accompanied by very low moisture contamination. The use of this electrolyte solution as the electrolyte solution in a rechargeable lithium battery reduces the internal impedance in the rechargeable lithium battery. This situation provides a high electric current in the rechargeable lithium battery and to further prolongs the charging and discharging cycle life of the rechargeable lithium battery.

As for the organic fluorine-silicon compound salt as the electrolyte, it is desired to be sufficiently dehydrated and deoxygenated prior to disposing the electrolyte in a rechargeable lithium battery.

The organic fluorine-silicon compound salt represented by the foregoing general formula $M_m(R_nSiF_{4-n+m})$ used as the electrolyte in the rechargeable lithium battery according to the present invention may be prepared by any of the following preparation manners (1) and (2).

Preparation Manner (1):

An aqueous solution of a compound represented by the general formula $R_nSiF_{4-n}$ is added to an aqueous solution of an alkali fluoride (MF) to cause chemical reaction between the two compounds as shown in the following reaction formula, to thereby obtain an organic fluorine-silicon compound salt.

$$R_nSiX_{4-n}+mMF \rightarrow M_m(R_nSiF_{4-n+m}) \qquad (a)$$

Wherein, n=an integer of 1 to 3; m=1, 2,; when n =2, $R_nSiF_{4-n}$ may be $RR'SiF_2$; when n=3, $R_nSiF_{4-n}$ may be $RR'R''SiF$; R is an alkyl group such as methyl group ($CH_3$—), ethyl group ($C_2H_5$—), butyl group ($C_3H_7$—), or the like, or an aromatic group such as phenyl (Ph) group ($C_6H_5$—), or the like; M is Li, Na, K, or $R_4N$. The $R_4N$ can include $Et_4N$ with Et being an ethyl group and $Bu_4N$ with Bu being a butyl group.

Specific examples of the reaction formula (a) are:

$$RSiF_3+2MF \rightarrow M_2(RSiF_5) \qquad (a\text{-}i)$$

and $$R_3SiF+MF \rightarrow M(R_3SiF_2) \qquad (a\text{-}ii)$$

Preparation Manner (2):

An organic fluorine-silicon compound salt represented by the general formula $M_m(R_nSiF_{4-n+m})$ may be prepared by a synthesis manner utilizing substitution reaction of halogen element as shown in the following reaction formula.

$$R_nSiX_{4-n}+hMF \rightarrow M_m(R_nSiF_{4-n+m})+(h-m)MX \qquad (b)$$

Wherein, n=an integer of 1 to 3; m=1, 2,; h=4−n+m; X=Cl, Br, I, RCOO, OH, or OR; R and M are Of the same meanings as in the case of the reaction formula (a).

A specific example of the reaction formula (b) is:

$$RSiX_3+5MF \rightarrow M_2(RSiF_5)+3 \text{ MX} \qquad (b\text{-}i)$$

In the present invention, the organic fluorine-silicon compound salt as the electrolyte in a rechargeable lithium battery may be used in a manner of using it as it is, a manner of an electrolyte solution obtained by dissolving it in an appropriate solvent, or a manner of using an immobilized product obtained by adding a gelation agent such as polymer to said electrolyte solution to immobilize the electrolyte (that is, the organic fluorine-silicon compound salt).

However, an electrolyte solution obtained by dissolving the electrolyte (that is, the organic fluorine-silicon compound salt) in an appropriate solvent is desired to be used in a way that said electrolyte solution is retained in an porous member as the separator 104.

As for the electrical conductivity of the electrolyte, it is desired to be preferably $1 \times 10^{-3}$ S/cm or more or more preferably, $5 \times 10^{-3}$ S/cm or more in terms of the electrically conductivity value at 25° C.

The solvent in which the electrolyte (that is, the organic fluorine-silicon compound salt) is dissolved can include acetonitrile, benzonitrile, propylene carbonate, ethylene carbonate, dimethyl carbonate, diethyl carbonate, dimethylformamide, tetrahydrofuran, nitrobenzene, dichloroethane, diethoxyethane, 1,2-dimethoxyethane, chlorobenzene, γ-butyrolactone, dioxolan, sulfolan, nitromethane, dimethyl sulfide, dimethyl sulfoxide, methyl formate, 3-methyl-2-oxazolidinone, 2-methyltetrahydrofuran, 3-propylsydonone, sulfur dioxide, phosphoryl chloride, thionyl chloride, sulfuryl chloride, and mixtures of two or more of these.

As for these solvents, it is desired for them to be subjected to dehydration using activated alumina, molecular sieve, phosphorous pentaoxide, or calcium chloride, prior to their use. Alternatively, it is possible for them to be subjected to distillation in an atmosphere composed of inert gas in the presence of an alkali metal, wherein moisture and foreign matters are removed.

In order to prevent leakage of the electrolyte solution, it is desired for the electrolyte solution to be gelated using an appropriate gelation agent as herein described.

The gelation agent usable in this case can include polymers having a property such that it absorbs the solvent of the electrolyte solution to swell. Specific examples of such polymer are polyethylene oxide, polyvinyl alcohol, and polyacrylamide.

ANODE

The anode 101 comprises an anode active material capable of serving as a host material for lithium ion.

Specific examples of such anode active material are carbonous materials including graphite, lithium metal, lithium alloys, materials containing a metal element capable of forming an alloy with lithium element, porous metallic materials, transition metal oxides and transition metal sulfides which provide an electromotive force with a cathode active material of the cathode 102.

In the case where such an anode active material is in a powdery form, an anode active material layer is formed on an anode collector using a binder or by way of sintering treatment. In the case where the anode active material in a powdery form passes low electrical conductivity, it is necessary to incorporate an electrically conductive additive into the anode active material upon forming the anode active material layer.

The above anode collector serves to effectively supply an electric current so that it can be efficiently consumed for the battery reaction upon charging, and to effectively collect an electric current generated upon discharging. The anode collector is therefore desired to be constituted by a material which has a high electrical conductivity and is inactive to the battery reaction. The material by which the anode collector is constituted can include metals such as Ni, Ti, Cu, Al, Pt, Pd, Au, and Zn, and alloys of two or more these metals such as stainless steel.

The anode collector may be shaped in a plate-like form, foil-like form, mesh form, porous form-like sponge, fabric form, punching metal form, or expanded metal form.

The above binder usable upon the formation of the anode active material layer can include polyolefins such as polyethylene, polypropylene, and the like, and fluororesins such as polyvinylidene fluoride, tetrafluoroethylene polymer, and the like.

The above electrically conductive additive can include carbon blacks such as acetylene black and ketjen black, graphite, and metals which are inactive to the battery reaction.

CATHODE

The cathode 102 generally comprises a cathode collector, a cathode active material, an electrically conductive assistant, and a binder.

Particularly, the cathode is usually formed by disposing a mixture of a cathode active material, an electrically conductive additive and a binder on a member capable of serving as a cathode collector.

The cathode active material serves as a host material of allowing lithium ion to be inserted thereinto and allowing lithium ion to be released therefrom. The material by which the cathode active material is constituted can include transition metal oxides, transition metal sulfides, lithium-transition metal oxides, and lithium-transition metal sulfides. The transition metal element of these transition metal oxides and transition metal sulfides can include transition metal elements partly having a d-shell or f-shell such as Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag, and Au. Of these, Ti, V, Cr, Mn, Fe, Co, Ni, and Cu belonging to the first transition series metal element are the most appropriate.

The above cathode collector serves to effectively supply an electric current so that it can be efficiently consumed for the battery reaction upon charging, and to effectively collect an electric current generated upon discharging. The cathode collector is therefore desired to be constituted by a material which has a high electrical conductivity and is inactive to the battery reaction. The material by which the cathode collector is constituted can include metals such as Ni, Ti, Cu, Al, Pt, Pd, Au, and Zn, and alloys of two or more these metals such as stainless steel.

The cathode collector may be shaped in a plate-like form, foil-like form, mesh form, porous form-like sponge, fabric form, punching metal form, or expanded metal form.

The above binder can include polyolefins such as polyethylene, polypropylene, and the like, and fluororesins such as polyvinylidene fluoride, tetrafluoroethylene polymer, and the like.

The above electrically conductive additive can include carbon blacks such as acetylene black and ketjen black, graphite, and metals which are inactive to the battery reaction.

SEPARATOR

The separator 104 is disposed between the anode 101 and the cathode 102, and it serves to prevent the anode and the cathode from suffering from internal-shorts. In addition, the separator also serves to retain the electrolyte 103 (or the electrolyte solution) as previously described.

The separator is required to have a porous structure or a structure having a number of fine perforations capable of allowing lithium ion to pass therethrough and it is also required to be insoluble into and stable to the electrolyte solution.

The separator is desired to be constituted by a nonwoven fabric or a membrane having a micropore structure made of glass, polyolefins such as polypropylene, polyethylene and the like, or fluororesin. Alternatively, the separator may be constituted by a metal oxide film or a resin film combined with a metal oxide respectively having a plurality of fine perforations. In a preferred embodiment, the separator is constituted by a multilayered metal oxide film. In this case, the separator effectively prevents a dendrite from passing therethrough and because of this, the occurrence of internal-shorts between the anode and the cathode is desirably prevented. In another preferred embodiment, the separator is constituted by an incombustible fluororesin, glass or metal oxide film. In this case, an improvement can be attained in terms of the safety even in the case where such internal-shorts should be unexpectedly occurred.

SHAPE AND STRUCTURE OF RECHARGEABLE LITHIUM BATTERY

There is no particular limitation for the shape of the rechargeable lithium battery according to the present invention.

The rechargeable lithium battery according to the present invention may be in the form of a flat round shape (or a coin-like shape), a cylindrical shape, a prismatic shape, or a sheet-like shape.

In the case where the rechargeable lithium battery is shaped in a spiral-wound cylindrical form, the anode, separator and cathode are arranged in the named order and they are spriral-wound and because of this, there are provided advantages such that the battery area can be increased as desired and a high electric current can be passed upon charging and discharging.

In the case where the rechargeable lithium battery is shaped in a prismatic form, there is provided an advantage in that the space of a device for housing the rechargeable lithium battery can be effectively utilized.

As for the structure of the rechargeable lithium battery according to the present invention, it can optionally made to be of a single layer structure or a stacked structure.

Figure 2:
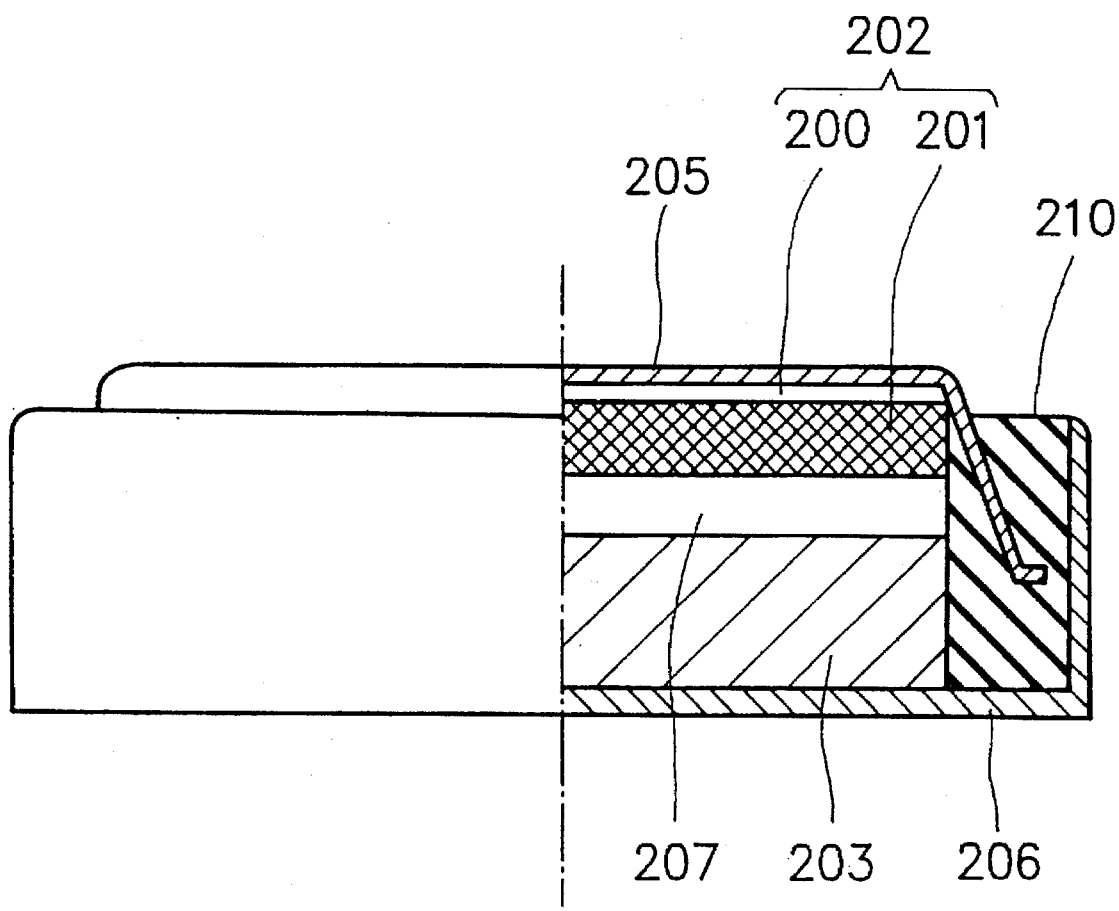
FIG. 2 is a schematic cross-sectional view illustrating an example of a single-layer system flat rechargeable battery according to the present invention.
Figure 3:
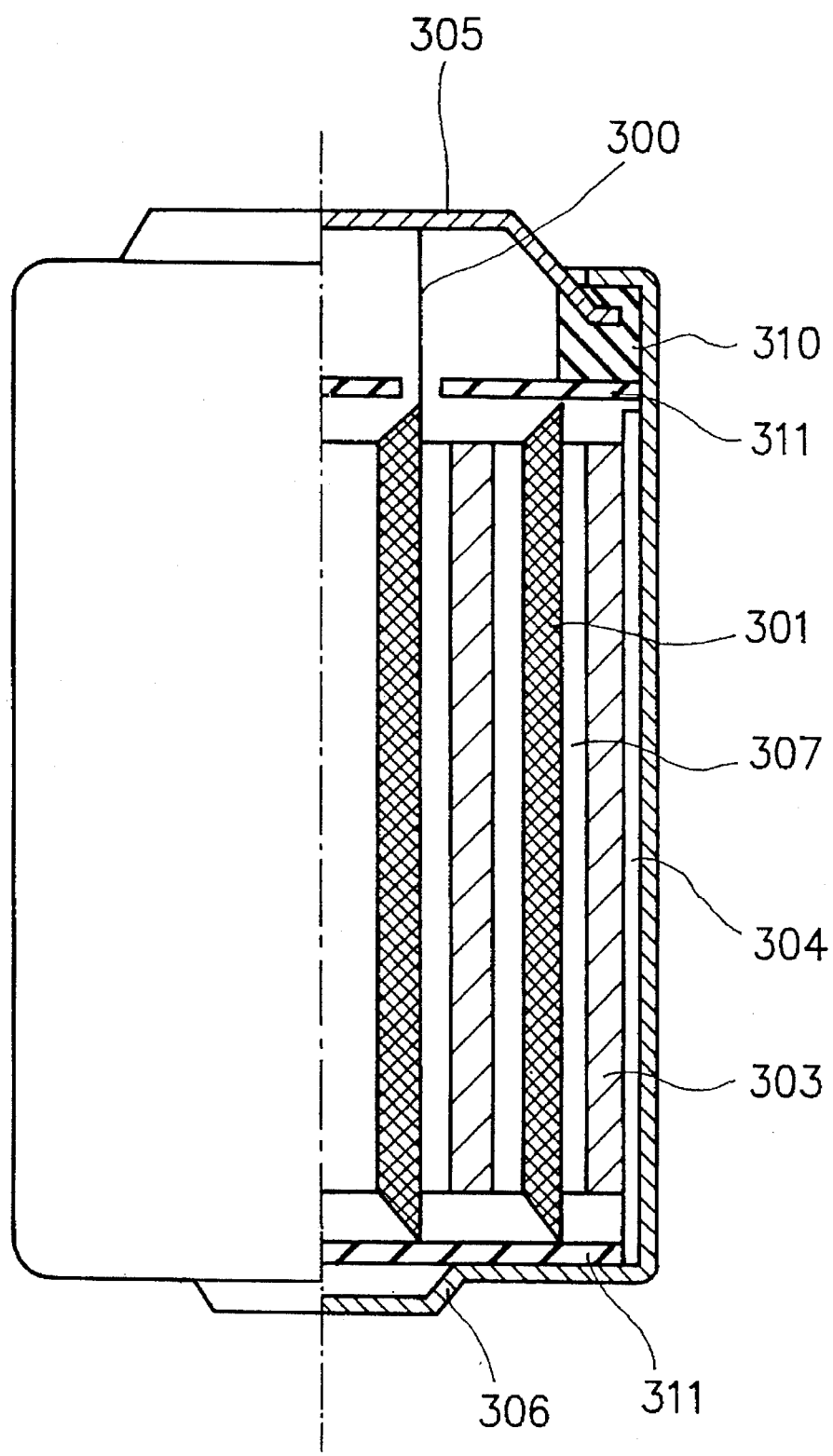
FIG. 3 is a schematic cross-sectional view illustrating an example of a spiral-wound cylindrical rechargeable battery according to the present invention.

FIG. 2 is a schematic cross-sectional view illustrating an example of a single-layer structure type flat rechargeable lithium battery according to the present invention. FIG. 3 is a schematic cross-sectional view illustrating an example of a spiral-wound cylindrical rechargeable lithium battery according to the present invention.

In FIGS. 2 and 3, each of reference numerals 200 and 300 indicates an anode collector, each of reference numerals 201 and 301 an anode active material layer, reference 202 (in FIG. 2) an anode, each of reference numerals 203 and 303 a cathode active material layer, each of reference numerals 205 and 305 an anode terminal (or an anode cap), each of reference numerals 206 and 306 a cathode can, each of reference numerals 207 and 307 a separator with the foregoing electrolyte (or the foregoing electrolyte solution) according to the present invention retained therein, and each of reference numerals 210 and 310 an insulating packing. In the configuration shown in FIGS. 2 and 3, the cathode can (206, 306) also serves as a cathode terminal.

In FIG. 3, reference numeral 304 indicates a cathode collector, and reference numeral 311 an insulating plate.

Particularly, in the single-layer structure type flat rechargeable lithium battery according to the present invention shown in FIG. 2, a stacked body comprising the cathode containing the cathode active material (203) and the the anode (202) containing the anode active material (201) and the anode collector (200) stacked and having at least the separator (207) interposed between the cathode and the anode and having an electrolyte solution comprising the foregoing organic fluorine-silicon compound salt containing at least silicon, fluorine and carbon elements retained therein is housed in the cathode can 206 on the cathode side. And the stacked body in the cathode can 206 is sealed by the insulating packing 210 (comprising an insulating member) and the anode terminal 205 (or the anode cap).

In the spiral-wound cylindrical rechargeable lithium battery according to the present invention shown in FIG. 3, a stacked body wound in multiple about a predetermined axis is housed in the cathode can 306 such that the side face and a given bottom face side of the stacked body are covered by the cathode can, said stacked body comprising at least the separator (307) having an electrolyte solution comprising the foregoing organic fluorine-silicon compound salt containing at least silicon, fluorine and carbon elements retained therein interposed between the cathode containing the cathode active material (303) and the anode containing the anode active material (301). And the stacked body in the cathode can 306 is sealed by the insulating packing 310 (comprising an insulating member).

The fabrication of a rechargeable lithium battery of the configuration shown in FIG. 2 or FIG. 3 is conducted, for example, in the following manner. That is, a combination comprising the separator (207, 307) interposed between the anode active material layer (201, 301) and the cathode active material layer (203, 303) is positioned in the cathode can (206, 206). Thereafter, the electrolyte is introduced thereinto. The resultant is assembled with the anode cap (205, 305) and the insulating packing (210, 310), followed by subjecting to caulking treatment. Thus, there is obtained the rechargeable lithium battery.

The preparation of the constituent materials for the rechargeable lithium battery is desired to be conducted in a dry air atmosphere free of moisture or a dry inert gas atmosphere free of moisture in order to prevent the occurrence of chemical reaction of lithium with water and also in order to prevent the rechargeable lithium battery from being deteriorated due to chemical reaction of lithium with water in the inside of the battery.

As the constituent of the insulating packing (210, 310), there can be used fluororesin, polyamide resin, polysulfone resin, or various rubbers. The sealing is typically conducted using a gasket such as the insulating packing, as shown in FIGS. 2 and 3. Other than this, it can be conducted by means of glass sealing, adhesive sealing, welding or soldering.

As the constituent of the insulating plate 311 shown in FIG. 3, there can be used organic resins and ceramics.

Any of the cathode can (206, 306) and the anode cap (205, 305) may be constituted by stainless steel, titanium clad stainless steel, copper clad stainless steel, or nickel-plated steel.

In any of the configurations shown in FIGS. 2 and 3, the cathode can (206, 306) is designed to serve also as a battery housing. In the case where a battery housing is independently used, the battery housing can be constituted by a metal such as zinc, an alloy such as stainless steel, a plastic such as polypropylene, or a composite of a metal or glass fiber with plastic.

Although not indicated in FIGS. 2 and 3, but it is possible to employ an appropriate safety vent in any of the configurations shown in FIGS. 2 and 3, which serves to ensure the safety when the iside pressure of the rechargeable battery is incidentally increased, by communicating the inside of the rechargeable battery with the outside to thereby reduce the increased inside pressure of the rechargeable battery. The safety vent may be constituted by a material comprising a rubber, a spring or a rupture foil.

In the following, the present invention will be described in more detail with reference to examples, which are only for illustrative purposes but not intended to restrict the scope of the present invention to these examples.

Example 1 and Comparative Example 1

Example 1

There was prepared a rechargeable lithium battery of the configuration shown in FIG. 2 in the following manner.

1. Preparation of Electrolyte Solution to be Retained in Separator 207

(1) Preparation of Electrolyte

There was provided a mixed solvent composed of tetrahydrofuran and pure water with an equivalent mixing ratio. 1M (mol/l) of triphenylfluorosilane ($Ph_3SiF$) was dissolved in the mixed solvent. The resultant solution was dropwise added to an aqueous solution containing lithium fluoride (LiF) with a content of 2M to cause chemical reaction between the $Ph_3SiF$ and LiF, followed by subjecting to concentration using an evaporator, to obtain a precipitate of triphenylsilyldifluoride lithium salt.

The resultant precipitate was washed with pure water, followed by drying at 100° C. under reduced pressure to obtain a triphenylsilyldifluoride lithium salt $Li(Ph_3SiF_2)$ as an electrolyte.

(2) Preparation of Electrolyte Solution

There was provided a moisture-free mixed solvent composed of ethylene carbonate (EC) and dimethyl carbonate (DMC) with an equivalent mixing ratio. 1M (mol/l) of the $Li(Ph_3SiF_2)$ obtained in the above (1) was dissolved in the mixed solvent. Thus, there was obtained an electrolyte solution.

A small amount of the resultant electrolyte solution was reserved as a specimen for the measurement of moisture content, which will be later described.

2. Formation of Cathode 203

Lithium carbonate and cobalt carbonate were mixed with a mol ratio of 1:2, followed by subjecting to heat treatment in an air stream maintained at 800° C., to obtain a lithium-cobalt oxide material as a cathode active material.

The lithium-cobalt oxide material thus obtained was mixed with 3 wt. % of acetylene black powder and 5 wt. % of polyvinylidene fluoride powder, followed by adding N-methyl-2-pyrrolidone, to obtain a paste.

The paste thus obtained was applied on an aluminum foil in an expanded metal-like form as a cathode collector by means of coating process. The resultant was dried, followed by drying at 150° C. under reduced pressure. Thus, there was obtained a cathode 203.

3. Formation of Anode 202

There was provided, as the anode active material 201, a natural graphite fine powder obtained by subjecting natural graphite to heat treatment at 2000° C. in a stream of argon.

Then, 5 wt. % of polyvinylidene fluoride powder was mixed in the graphite fine powder, followed by adding N-methyl-2-pyrrolidone, to obtain a paste. The paste thus obtained was applied on a copper foil as the anode collector 200 by means of coating process, followed by drying at 150° C. under reduced pressure. Thus, there was obtained an anode 202.

In the above, the amount of the graphite fine powder as the anode active material 201 was made to be 60% of the theoretical electric capacity of the foregoing cathode active material in terms of the amount of accumulating one lithium atom per six carbon atoms.

4. Separator 207

There was provided a polypropylene member having a number of fine perforations as the separator 207.

5. Fabrication of Rechargeable Lithium Battery

The fabrication of a rechargeable lithium battery was conducted in a dry argon atmosphere.

The separator 207 was interposed between the cathode 203 and the anode 202, and the resultant was inserted into a cathode can 206 made of titanium clad stainless steel. Then, the electrolyte solution was injected into the cathode can such that it was retained in the separator. The resultant was sealed using an anode cap 205 made of titanium clad stainless steel and an insulating packing 210 made of polypropylene.

Thus, there was obtained a rechargeable lithium battery.

Comparative Example 1

The procedures of Example 1 were repeated, except that the electrolyte solution was replaced by an electrolyte solution prepared in a manner which will be described below, to thereby obtain a rechargeable lithium battery.

There was prepared an electrolyte solution in the following manner.

That is, there was provided a moisture-free mixed solvent composed of ethylene carbonate (EC) and dimethyl carbonate (DMC) with an equivalent mixing ratio.

Separately, lithium hexafluorophosphate ($LiPF_6$) was dried at 100° C. under reduced pressure.

Then, 1M (mol/l) of the $LiPF_6$ thus treated was dissolved in the above mixed solvent to obtain an electrolyte solution.

A small amount of the resultant electrolyte solution was reserved as a specimen for the measurement of moisture content, which will be later described.

Evaluation (1) Each of the electrolyte solution specimen reserved in Example 1 and the electrolyte solution specimens reserved in Comparative Example 1 was subjected to moisture content measurement using a Karl Fischer moisture meter. The measured moisture content of the former was compared with that of the latter, which was set at 1. As a result, it was found that the moisture content of the former is 0.2 times that of the latter.

(2) Each of the rechargeable lithium batteries obtained in Example 1 and Comparative Example 1 was evaluated with respect to charging and discharging cycle life through the charging and discharging cycle test.

The charging and discharging cycle test was conducted by placing each rechargeable lithium battery in a charging and discharging device HJ-106M (produced by Hokuto Denko Kabushiki Kaisha), where charging and discharging were alternately repeated under conditions of 1 C (electric current of 1 time the electric capacity per an hour theoretically based on the electric capacity calculated from the cathode active material of each rechargeable lithium battery) for the charging and discharging, and 30 minutes for the rest. For other conditions, the cut-off voltage upon operating charging was made to be 4.5 V and the cut-off voltage upon operating discharging was made to be 2.5 V.

The charging and discharging cycle test was initiated by charging. And the charging rate was made to be 50% of the theoretical electric capacity of the cathode active material.

In the charging and discharging test, as for each rechargeable lithium battery, its charging and discharging cycle life was observed.

The charging and discharging cycle life was based on the number of the charging and discharging cycles repeated until the battery capacity became less than 60% of the initial battery capacity.

The resultant charging and discharging cycle life for the rechargeable lithium battery of Example 1 was compared with that for the rechargeable lithium battery of Comparative Example 1, which was set at 1. As a result, the former was found to be superior to the latter by 1.2 times.

(3) Based on the results obtained in the above (1) and (2), it is understood that the rechargeable lithium battery obtained in Example 1 is superior to the rechargeable lithium battery obtained in Comparative Example 1 in terms of the charging and discharging cycle life. Particularly, it is understood that the use of a specific electrolyte solution (that is, the electrolyte solution prepared in step 1 in Example 1) markedly diminishes the moisture content of the electrolyte solution used in a rechargeable lithium battery and attain the production of a highly reliable rechargeable lithium battery which has a long charging and discharging cycle life even under charging condition of accumulating 0.1 or more of lithium atom per one carbon atom of the graphite as the anode active material of the anode.

Separately, the rechargeable lithium battery of Example 1 and the rechargeable lithium battery of Comparative Example 1 having been subjected to the charging and discharging test were demolished. And the generation of a lithium dendrite on the surface of the anode was examined. As a result, it was found that the lithium dendrite generation in the former is apparently smaller than that in the latter.

Example 2 and Comparative Example 2

Example 2

There was prepared a rechargeable lithium battery of the configuration shown in FIG. 2 in the following manner.
1. Preparation of Electrolyte Solution to be Retained in Separator 207
(1) Preparation of Electrolyte An aqueous solution containing phenyltrichlorosilane ($PhSiCl_3$) with a content of 0.5M(mol/l) was dropwise added to an aqueous solution containing lithium fluoride (LiF) with a content of 3M to cause chemical reaction between the $PhSiCl_3$ and LiF, whereby a reaction solution was obtained. The resultant reaction solution was subjected to concentration using an evaporator, to obtain a precipitate of phenylsilylpentafluoride lithium salt.

The resultant precipitate was washed with pure water, followed by drying at 100° C. under reduced pressure condition, to obtain a phenylsilylpentafluoride lithium salt [$Li_2(PhSiF_5)$] as an electrolyte.

(2) Preparation of Electrolyte Solution

There was provider a moisture-free mixed solvent composed of ethylene carbonate (EC) and dimethyl carbonate (DMC) with an equivalent mixing ratio. 1M (mol/l) of the $Li_2(PhSiF_5)$ obtained in the above (1) was dissolved in the mixed solvent. Thus, there was obtained an electrolyte solution.

A small amount of the resultant electrolyte solution was reserved as a specimen for the measurement of moisture content, which will be later described.

2. Formation of Cathode 203

Lithium nitrate and nickel carbonate were mixed with a mol ratio of 1:1, followed by subjecting to heat treatment in an air stream maintained at 750° C., to obtain a lithium-nickel oxide material as a cathode active material.

The lithium-nickel oxide material thus obtained was mixed with 3 wt. % of acethylene black powder and 5 wt. % of polyvinylidene fluoride powder, followed by adding N-methyl-2-pyrrolidone, to obtain a paste.

The paste thus obtained was applied on an aluminum foil provided with extended connection terminals as a cathode collector by means of coating process. The resultant was dried, followed by drying at 150° C. under reduced pressure. Thus, there was obtained a cathode 203.

3. Formation of Anode 202

There was provided an aluminum foil having a surface etched with the use of an aqueous solution containing 5 wt. % of potassium hydroxide. The aluminum foil was immersed in a sulfuric acid aqueous solution of 12M(mol/l) as an electrolyte solution, and a glassy carbon member as a counter electrode was also immersed in said sulfuric acid aqueous solution. And a D.C. voltage of 30 V was passed between the aluminum foil and the gassy carbon member, whereby the etched surface of the aluminum foil was anodized. The aluminum foil thus treated was washed with pure water, successively washed with acetone and isopropyl alcohol, followed by drying. The resultant was dried at 150° C. under reduced pressure condition. Thus, there was obtained an anode 202.

4. Separator 207

There was provided a polypropylene member having a number of fine perforations as the separator 207.

5. Fabrication of Rechargeable Lithium Battery

The fabrication of a rechargeable lithium battery was conducted in a dry argon atmosphere.

The separator 207 was interposed between the cathode 203 and the anode 202, and the resultant was inserted into a cathode can 206 made of titanium clad stainless steel. Then, the electrolyte solution was injected into the cathode can such that it was retained in the separator. The resultant was sealed using an anode cap 205 made of titanium clad stainless steel and an insulating packing 210 made of polypropylene.

Thus, there was obtained a rechargeable lithium battery.

Comparative Example 2

The procedures of Example 1 were repeated, except that the electrolyte solution was replaced by an electrolyte solution prepared in a manner which will be described below, to thereby obtain a rechargeable lithium battery.

There was prepared an electrolyte solution in the following manner.

That is, there was provided a moisture-free mixed solvent composed of ethylene carbonate (EC) and dimethyl carbonate (DMC) with an equivalent mixing ratio.

Separately, lithium borofluoride ($LiBF_4$) was dried at 100° C. under reduced pressure condition.

Then, 1M (mol/l) of the $LiBF_4$ thus treated was dissolved in the above mixed solvent to obtain an electrolyte solution.

A small amount of the resultant electrolyte solution was reserved as a specimen for the measurement of moisture content, which will be later described.

15

Evaluation (1) Each of the electrolyte solution specimens reserved in Example 2 and the electrolyte solution specimen reserved in Comparative Example 2 was subjected to moisture content measurement using a Karl Fischer moisture meter. The measured moisture content of the former was compared with that of the latter, which was set at 1. As a result, it was found that the moisture content of the former is 0.3 times that of the latter.

(2) Each of the rechargeable lithium batteries obtained in Example 2 and Comparative Example 2 was evaluated with respect to charging and discharging cycle life through the charging and discharging cycle test in the same manner as in Example 1 and Comparative Example 1.

The resultant charging and discharging cycle life for the rechargeable lithium battery of Example 2 was compared with that for the rechargeable lithium battery of Comparative Example 2, which was set at 1. As a result, the former was found to be superior to the latter by 1.5 times.

(3) Based on the results Obtained in the above (1) and (2), it is understood that the rechargeable lithium battery obtained in Example 2 is superior to the rechargeable lithium battery obtained in Comparative Example 2 in terms of the charging and discharging cycle life. Particularly, it is understood that the use of a specific electrolyte solution (that is, the electrolyte solution prepared in step 1 in Example 2) markedly diminishes the moisture content in an electrolyte solution used in a rechargeable lithium battery and provides a highly reliable rechargeable lithium battery having an anode comprising an anodized aluminum, which has a long charging and discharging cycle life.

Separately, as for each of the rechargeable lithium battery obtained in Example 2 and the rechargeable lithium battery obtained in Comparative Example 2, examination was conducted of the situation of a rise in the battery voltage when a constant-current is charged upon charging in the alternate repetition of charging and discharging. As a result, the former was found to be apparently smaller than the latter in terms of the the rise in the battery voltage.

Further, the rechargeable lithium battery of Example 2 and the rechargeable lithium battery of Comparative Example 2 having been subjected to the charging and discharging test were demolished. The generation of a lithium dendrite on the surface of the anode was examined. As a result, it was found that the lithium dendrite generation in the former is apparently smaller than that in the latter.

Example 3 and Comparative Example 3

Example 3

There was prepared a rechargeable lithium battery of the configuration shown in FIG. 2 in the following manner.

1. Preparation of Electrolyte Solution to be Retained in Separator 207

(1) Preparation of Electrolyte

An aqueous solution containing ethyltrifluorosilane ($C_2H_5SiF_3$) with a content of 1M(mol/l) was dropwise added to an aqueous solution containing lithium fluoride (LiF) with a content of 3M to cause chemical reaction between the $C_2H_5SiF_3$ and LiF, whereby a reaction solution was obtained. The resultant reaction solution was subjected to concentration using an evaporator, to obtain a precipitate of ethylsilylpentafluoride lithium salt.

The resultant precipitate was washed with pure water, followed by drying at 100° C. under reduced pressure

16 condition, to obtain an ethylsilylpentafluoride lithium salt [$Li_2(C_2H_5SiF_5)$] as an electrolyte.

(2) Preparation of Electrolyte Solution

There was provided a moisture-free mixed solvent composed of ethylene carbonate (EC) and dimethyl carbonate (DMC) with an equivalent mixing ratio. 1M (mol/l) of the $Li_2(C_2H_5SiF_5)$ obtained in the above (1) was dissolved in the mixed solvent. Thus, there was obtained an electrolyte solution.

A small amount of the resultant electrolyte solution was reserved as a specimen for the measurement of moisture content, which will be later described.

2. Formation of Cathode 203

Electrolytic manganese dioxide and lithium carbonate were mixed with a mol ratio of 1:0.4, followed by subjecting to heat treatment in an air stream maintained at 800° C., to obtain a lithium-manganese oxide material as a cathode active material.

The lithium-manganese oxide material thus obtained was mixed with 3 wt. % of acetylene black powder and 5 wt. % of polyvinylidene fluoride powder, followed by adding N-methyl-2-pyrrolidone, to obtain a paste.

The paste thus obtained was applied on an aluminum foil as a cathode collector by means of coating process. The resultant was dried, followed by drying at 150° C. under reduced pressure. Thus, there was obtained a cathode 203.

3. Formation of Anode 202

A metallic lithium foil as the anode active material 201 was laminated onto an expanded metal of nickel as the anode collector 200. Thus, there was obtained an anode 202.

4. Separator 207

There was provided a polypropylene member having a number of fine perforations as the separator 207.

5. Fabrication of Rechargeable Lithium Battery

The fabrication of a rechargeable lithium battery was conducted in a dry argon atmosphere.

The separator 207 was interposed between the cathode 203 and the anode 202, and the resultant was inserted into a cathode can 206 made of titanium clad stainless steel. Then, the electrolyte solution was injected into the cathode can such that it was retained in the separator. The resultant was sealed using an anode cap 205 made of titanium clad stainless steel and an insulating packing 210 made of polypropylene.

Thus, there was obtained a rechargeable lithium battery.

Comparative Example 3

The procedures of Example 1 were repeated, except that the electrolyte solution was replaced by an electrolyte solution prepared in a manner which will be described below, to thereby obtain a rechargeable lithium battery.

There was prepared an electrolyte solution in the following manner.

That is, there was provided a moisture-free mixed solvent composed of ethylene carbonate (EC) and dimethyl carbonate (DMC) with an equivalent mixing ratio.

Separately, lithium trifluoromethanesulfonate (Li ($CF_3SO_3$)) was dried at 100° C. under reduced pressure condition.

Then, 1M (mol/l) of the $Li(CF_3SO_3)$ thus treated was dissolved in the above mixed solvent to obtain an electrolyte solution.

A small amount of the resultant electrolyte solution was reserved as a specimen for the measurement of moisture content, which will be later described.

Evaluation (1) Each of the electrolyte solution specimen reserved in Example 3 and the electrolyte solution specimens reserved in Comparative Example 3 was subjected to moisture content measurement using a Karl Fischer moisture meter. The measured moisture content of the former was compared with that of the latter, which was set at 1. As a result, it was found that the moisture content of the former is 0.3 time that of the latter.

(2) Each of the rechargeable lithium batteries obtained in Example 3 and Comparative Example 3 was evaluated with respect to charging and discharging cycle life through the charging and discharging cycle test in the same manner as in Example 1 and Comparative Example 1.

The resultant charging and discharging cycle life for the rechargeable lithium battery of Example 3 was compared with that for the rechargeable lithium battery of Comparative Example 3, which was set at 1. As a result, the former was found to be superior to the latter by 1.5 times.

(3) Based on the results obtained in the above (1) and (2), it is understood that the rechargeable lithium battery obtained in Example 3 is superior to the rechargeable lithium battery obtained in Comparative Example 3 in terms of the charging and discharging cycle life. Particularly, it is understood that the use of a specific electrolyte solution (that is, the electrolyte solution prepared in step 1 in Example 3) markedly diminishes the moisture content in an electrolyte solution used in a rechargeable lithium battery and provides a highly reliable rechargeable lithium battery which has a long in charging and discharging cycle life.

Separately, as for each of the rechargeable lithium battery obtained in Example 3 and the rechargeable lithium battery obtained in Comparative Example 3, examination was conducted of the situation of a rise in the battery voltage when a constant-current is charged upon charging in the alternate repetition of charging and discharging. As a result, the former was found to be apparently smaller than the latter in terms of the the rise in the battery voltage.

Further, the rechargeable lithium battery of Example 3 and the rechargeable lithium battery of Comparative Example 3 having been subjected to the charging and discharging test were opened. And the generation of a lithium dendrite on the surface of the anode was examined. As a result, it was found that the lithium dendrite generation in the former is apparently smaller than that in the latter.

Example 4

The procedures of Example 3 were repeated, except that the electrolyte solution was replaced by an electrolyte solution prepared in accordance with the procedures for the preparation of the electrolyte solution in step 1 of Example 1, to thereby obtain a rechargeable lithium battery having the configuration shown in FIG. 2.

In the above, a small amount of the resultant electrolyte solution was reserved as a specimen for the measurement of moisture content.

Evaluation (1) The electrolyte solution specimen reserved in Example 4 was subjected to moisture content measurement using a Karl Fischer moisture meter. The measured moisture content was compared with the previously measured moisture content of the electrolyte solution in Comparative Example 3, which was set at 1. As a result, it was found that the moisture content of the former is 0.2 times that of the latter.

(2) The rechargeable lithium battery obtained in Example 4 was evaluated with respect to charging and discharging cycle life through the charging and discharging cycle test in the same manner as in Example 1 and Comparative Example 1.

The resultant charging and discharging cycle life for the rechargeable lithium battery obtained in Example 4 was compared with the previously examined charging and discharging cycle life of the rechargeable lithium battery obtained in Comparative Example 3, which was set at 1. As a result, the former was found to be superior to the latter by 1.7 times.

(3) Based on the results obtained in the above (1) and (2), it is understood that the rechargeable lithium battery obtained in Example 4 is superior to the rechargeable lithium battery obtained in Comparative Example 3 in terms of the charging and discharging cycle life. Particularly, it is understood that the use of a phenyl group-bearing organic fluorine-silicon compound as an electrolyte provides of a highly reliable rechargeable lithium battery having a metallic lithium anode, which has a prolonged charging and discharging cycle life.

Separately, as for the rechargeable lithium battery obtained in Example 4, examination was conducted of the situation of a rise in the battery voltage when a constant-current is charged upon charging in the alternate repetition of charging and discharging. And the examined result was compared with the previously examined result for the rechargeable lithium battery obtained in Comparative Example 3.

As a result, the rechargeable lithium battery obtained in Example 4 was found to be apparently smaller than the rechargeable lithium battery obtained in Comparative Example 3 in terms of the the rise in the battery voltage.

Further, the rechargeable lithium battery of Example 4 having been subjected to the charging and discharging test was opened. And the generation of a lithium dendrite on the surface of the anode was examined. As a result, it was found that the lithium dendrite generation in the rechargeable lithium battery of Example 4 is apparently smaller than the above examined lithium dendrite generation in the rechargeable lithium battery of Comparative Example 3.

Now, in the above Examples 1 to 4, there were used lithium-cobalt oxide material, lithium-nickel oxide material, and lithium-manganese oxide material as the cathode active material. However, these oxide materials are not limiting. Besides these, other various metal oxide materials such as lithium-vanadium oxide material, lithium-iron oxide material, and the like are also effectively usable as the cathode active material in the present invention. Similarly, in the above Examples 1 to 4, there were used graphite, anodized aluminum, and metallic lithium as the anode active material. However, these are not limitative. Besides these, various carbonous materials obtained by baking organic resins, transition metal oxide materials, and transition metal sulfide materials are also effectively usable as the anode active material in the present invention.

From the above description, the following facts are understood. That is, the use of a specific electrolyte comprising a salt of an organic fluorine-silicon compound according to the present invention affords a pronounced advantage in that no significant problems of invading moisture provided in the preparation of an electrolyte into a rechargeable lithium battery to be produced, as is found in the prior art. This provides for the production of a highly reliable lithium battery which is high in energy density and has a prolonged charging and discharging cycle life.

What is claimed is:

1. A rechargeable lithium battery comprising at least an anode, a separator, a cathode, and an electrolyte integrated in a battery housing, characterized in that said electrolyte comprises a salt of an organic fluorine-silicon compound containing at least fluorine, silicon and carbon elements as the constituents.

2. A rechargeable lithium battery according to claim 1, wherein the salt of the organic fluorine-silicon compound has a phenyl group.

3. A rechargeable lithium battery according to claim 1, wherein the salt of the organic fluorine-silicon compound salt is a member selected from the group consisting of lithium, sodium, potassium, and ammonium salts represented by the general formula $M_n(R_nSiF_{4-n+m})$ with R being an alkyl group or an aromatic group, M being Li, Na, K, or $R_4N$, m being a positive integer, and n being a positive integer, and mixtures of two or more of said salts.

4. A rechargeable lithium battery according to claim 1, wherein the salt of the organic fluorine-silicon compound is a lithium salt.

5. A rechargeable lithium battery according to claim 1, wherein the separator comprises a porous material and the electrolyte in the liquid state is retained in said porous material as the separator.

6. A rechargeable lithium battery according to claim 1, wherein the electrolyte is in a gelation state.

7. A rechargeable lithium battery according to claim 1, wherein the cathode contains a cathode active material selected from the group consisting of transition metal oxides, transition metal sulfides, lithium-transition metal oxides, and lithium-transition metal sulfides.

8. A rechargeable lithium battery according to claim 1, wherein the cathode comprises at least a cathode collector and a mixture comprising a cathode active material, an electrically conductive additive and a binder disposed on said cathode collector.

9. A rechargeable lithium battery comprising a stacked body disposed in a battery housing, said stacked body comprising a cathode containing a cathode active material and an anode containing an anode active material and an anode collector which are stacked through at least a separator having an electrolyte solution retained therein, said electrolyte solution comprising a salt of an organic fluorine-silicon compound containing at least fluorine, silicon and carbon elements as the constituents.

10. A rechargeable lithium battery according to claim 9, wherein the battery housing comprises at least a cathode can of covering the cathode side of the stacked body and an anode cap of covering the anode side of the stacked body.

11. A rechargeable lithium battery according to claim 9, wherein an insulating material is packed in the inside of the battery housing.

12. A rechargeable lithium battery comprising a cylindrical multipier structure disposed in a battery housing, said cylindrical multipier structure comprising a stacked body wound in multiple about a predetermined axis, said stacked body comprising a cathode containing a cathode active material and an anode containing an anode active material which are stacked through at least an separator having an electrolyte solution retained therein, said electrolyte solution comprising a salt of an organic fluorine-silicon compound containing at least fluorine, silicon and carbon elements as the constituents.

13. A rechargeable lithium battery according to claim 12, wherein an insulating material is packed in the inside of the battery housing.

* * * * *

UNITED STATES PATENT AND TRADEMARK OFFICE
CERTIFICATE OF CORRECTION

PATENT NO. : 5,658,689

DATED : August 19, 1997

INVENTOR(S): SOICHIRO KAWAKAMI ET AL.

Page 1 of 4

It is certified that error appears in the above-identified patent and that said Letters Patent is hereby corrected as shown below:

ON TITLE PAGE, AT [56], FOREIGN PATENT DOCUMENTS
"05047381" should read --5-047381--.

COLUMN 1
Line 33, "a" should read --as--;
Line 35, "day time" should read --daytime--;
Line 48, "light weight" should read --lightweight--;
Line 63, "and" should be deleted.

COLUMN 2
Line 33, "Charg-" should read --charg---.

COLUMN 4
Line 45, "lithium" should read --lithium,--, and "charge" should be deleted;
Line 58, "provides" should read --provide--;
Line 65, "the the" should read --the--.

COLUMN 5
Line 7, "to" should be deleted;
Line 8, "prolong" should read --prolongs--;
Line 45, "General" should read --general--.

COLUMN 6
Line 18, "to" should be deleted;
Line 36, "$R_nSiX_{4-n}$" should read --$R_nSiF_{4-n}$--;
Line 61, "Of" should read --of--.

UNITED STATES PATENT AND TRADEMARK OFFICE
CERTIFICATE OF CORRECTION

PATENT NO. : 5,658,689

DATED : August 19, 1997

INVENTOR(S): SOICHIRO KAWAKAMI ET AL.

It is certified that error appears in the above-identified patent and that said Letters Patent is hereby corrected as shown below:

COLUMN 7
Line 24, "2-oxazolidinone," should read --2-oxazolydinone,--;
Line 25, "3-propylsydonone," should read
  --2-propylsydnone,--;
Line 58, "passes" should read --possesses--.

COLUMN 9
Line 21, "an incombustible" should read --a noncombustible--;
Line 24, "be unexpectedly occurred." should read
  --unexpectedly occur.--
Line 48, "made" should read --be made--.

COLUMN 10
Line 8, "the the" should read --the--;
Line 39, "(206, 206)" should read --(206, 306)--.

COLUMN 11
Line 5, "but" should be deleted.

COLUMN 12
Line 48, "specimen" should read --specimens--;
Line 49, "specimens" should read --specimen--.

COLUMN 13
Line 30, "attain" should read --attains--;
Line 65, "provider" should read --provided--.

UNITED STATES PATENT AND TRADEMARK OFFICE
CERTIFICATE OF CORRECTION

PATENT NO. : 5,658,689

DATED : August 19, 1997

INVENTOR(S): SOICHIRO KAWAKAMI ET AL.

It is certified that error appears in the above-identified patent and that said Letters Patent is hereby corrected as shown below:

COLUMN 14
Line 12, "acethylene" should read --acetylene--;
Line 27, "gassy" should read --glassy--;
Line 32, "pressure condition." should read --pressure.--;
Line 61, "pressure condition." should read --pressure.--.

COLUMN 15
Line 21, "Obtained" should read --obtained--;
Line 40, "the the" should read --the--.

COLUMN 16
Line 1, "condition," should be deleted.
Line 66, "specimen" should read --specimens--;
Line 67, "specimens" should read --specimen--.

COLUMN 17
Line 5, "0.3 time" should read --0.3 times--;
Line 27, "in" should be deleted;
Line 35, "the the" should read --the--.

COLUMN 18
Line 17, "of" should be deleted;
Line 52, "limitative." should read --limiting.--;
Line 62, "provided" should be deleted.

COLUMN 19
Line 13, "salt" should be deleted.

UNITED STATES PATENT AND TRADEMARK OFFICE
CERTIFICATE OF CORRECTION

PATENT NO. : 5,658,689

DATED : August 19, 1997

INVENTOR(S): SOICHIRO KAWAKAMI ET AL.

It is certified that error appears in the above-identified patent and that said Letters Patent is hereby corrected as shown below:

COLUMN 20
Line 7, "an" should read --a--;
Line 20, "multipier" should read --multiplet--;
Line 21, "multipier" should read --multiplet--;
Line 25, "an" (first occurrence) should read --a--.

Signed and Sealed this

Ninth Day of June, 1998

BRUCE LEHMAN

Attest:

Attesting Officer

Commissioner of Patents and Trademarks